United States Patent [19]

Nolken

[11] 4,169,086

[45] Sep. 25, 1979

[54] AQUEOUS DISPERSION PAINT HAVING A HIGH WET ADHESION AND PROCESS FOR PREPARING SAME

[75] Inventor: Ernst Nölken, Frankfurt am Main, Fed. Rep. of Germany

[73] Assignee: Hoechst Aktiengesellschaft, Frankfurt, Fed. Rep. of Germany

[21] Appl. No.: 849,330

[22] Filed: Nov. 7, 1977

[30] Foreign Application Priority Data

Nov. 9, 1976 [DE] Fed. Rep. of Germany ....... 2651048

[51] Int. Cl.$^2$ ..................... C08L 23/18; C08L 25/06; C08L 33/18
[52] U.S. Cl. ........................... 260/29.6 MP; 526/193
[58] Field of Search ................ 526/193; 260/29.6 MP

[56] References Cited

FOREIGN PATENT DOCUMENTS 767793 7/1934 France.
869429 5/1961 United Kingdom.
869430 5/1961 United Kingdom.

OTHER PUBLICATIONS

Angew. Chemie, vol. 71, (1959), pp. 604–608, Messwarb, et al.

*Primary Examiner*—H. S. Cockeram
*Attorney, Agent, or Firm*—Curtis, Morris & Safford

[57] ABSTRACT

Emulsifier-containing plastics dispersions which serve as a binder for dispersion paints, should contain polymers forming a film at room temperature and having a high wet adhesion. Suitable polymers are prepared by polymerization of olefinically unsaturated monomers initiated by free radical-forming agents, especially in the presence of an emulsifier. As emulsifier there is used a salt of an acyl ester of the hydroxymethane-phosphonic acid. The emulsifier may remain in the dispersion ready-for-use without involving disadvantages for the wet adhesion.

7 Claims, No Drawings

AQUEOUS DISPERSION PAINT HAVING A HIGH WET ADHESION AND PROCESS FOR PREPARING SAME

It has been suggested that tensides must be used for preparing plastics dispersions by emulsion polymerisation of vinyl compounds. The emulsifiers generally used in this process mainly have hydrophobic hydrocarbon skeletons, for example paraffin chains with 12 to 18 carbon atoms which are linked to one or several hydrophilic groups such as oxethylate, carboxylate, sulfate, sulfonate, phosphate or phosphonate.

It has further been suggested that the quality of a plastic material may be impaired by emulsifiers which remain therein after precipitation of the latex. In some cases, however, emulsifiers which remain in the latex, may improve the properties of the latter; examples of those emulsifiers are fatty acids or resinic acids in styrene-butadiene copolymers.

Salts of fatty acids are not very suitable for the polymerization of vinyl compounds, which is carried out in a slightly acidic medium, because of the easy saponifiability of the monomers by alkalies, whereas with the use of tensides containing oxethylate, sulfate, sulfonate, phosphate and phosphonate groups there may be obtained the desired latices of high concentration.

Thus, plastics dispersions, which contain polymers forming a film at room temperature and which are used as latices in paints, papers, textile articles and adhesives, in most cases contain the emulsifier which has been used during their preparation. A further step, for example dialysis, would be necessary to remove this emulsifier; for a number of applications, however, this is by no means required. However, when using plastics dispersions containing an emulsifier in paints, which are applied on non-absorbent surfaces, for example lacquer coatings, the wet adhesion obtained is unsatisfactory so that the coating of paint detaches from the substrate. For solving this problem, various proposals have been made:

1. Preparation of the latex without the addition of emulsifiers by using a higher concentration of peroxy disulfate. These latices, however, have the disadvantage that they contain polymers of relatively low molecular weight, only. Due to the higher content of sulfate groups, which result from the decomposed initiator, the polymer has in this case hydrophilic properties.
2. Preparation of the latex by emulsion polymerization without the addition of emulsifiers and by copolymerization with maleic acid semi-esters. In this case, the solids content of the latices ranges from 20 to 30% by weight, only. For attaining latices with a higher concentration, a further processing step is necessary.
3. Treatment of the plastics dispersions with ethylene imine, which compound, however, is carcinogenic.
4. Copolymerization with monomers containing epoxide groups. These groups, however, may cause allergic reactions in humans. The direct contact with glucidyl acrylate, for example, with the skin, may cause very grave damages.
5. Copolymerization with unsaturated silanes. In this case, too, there must be used in addition to the emulsifier, the initiator, buffer substances, and the monomers, a further compound.

It has now been found that these disadvantages do not occur when the plastics dispersion used containing polymers, which form a film at room temperature and which have a high wet adhesion, consists of the following components:

(a) polymers or copolymers of vinyl esters, acrylic and methacrylic acid esters, styrene, vinyl halides, vinyl ethers, diolefins, α-olefins or nitrile groups-containing monomers, alone or in admixture with one another,
(b) optionally buffer substances, alkalies and water-soluble polymers and as emulsifiers salts of acyl esters of hydroxymethanephosphonic acid of the formula

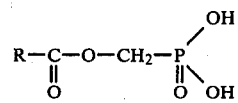

in which R is a hydrocarbon radical having from 5 to 23 carbon atoms, in an amount of from 0.1 to 5% by weight, calculated on the total quantity of the monomers used.

The preparation of lauric acid hydroxymethanephospho acid ester and its use as emulsifier has been described in French Pat. No. 767 793. This emulsifier has moreover been used for the preparation of plastics dispersions (cf. messwarb, et al., Angew. Chemie Vol. 71 (1959), p. 604). In the aforesaid messwarb, et al. reference, said ester among others is described as an emulsifer capable of being cleaved by hydrolysis and therefore suitable for the preparation of raw materials for lacquers free from emulsifiers, which lacquers are based on vinyl chloride-vinyl acetate copolymers. The pulverulent raw material for lacquers which is free from emulsifiers is prepared in this case by precipitating the copolymer emulsion by modifying the pH-value with cleavage of the emulsifier and by separating the polymer by washing. Said reference also describes other emulsifiers which may be split and used for the preparation of raw materials for lacquers free from emulsifiers.

It has now been found surprisingly that among the cleavable emulsifiers mentioned in said Messwarb, et al. reference only lauric acid hydroxymethane-phosphonic acid ester, which remains in the plastics dispersions, is capable of yielding polymer emulsions which impart a wet adhesion to paints.

For the preparation of the plastics dispersion according to the invention there are used salts of acyl esters of the hydroxymethanephosphonic acid the acyl radicals of which have from 6 to 24, preferably from 8 to 18 carbon atoms. The acyl radical may be linear or branched. The emulsifiers may be prepared by reacting the corresponding acid halides with hydroxymethanephosphonic acid at elevated temperature, for example at 120° C. Examples of suitable salts are the ammonium, lithium, sodium, potassium and tetramethylammonium salt. It is likewise possible to neutralize the phosphonic acid with triethylamine, ethanolamine, dimethylaminoethanol, propylamine or 2-amino-2-methyl-propanol-(1). Especially preferred are the primary salts of the acylated hydroxymethane-phosphonic acid, which are prepared by neutralizing the acid up to a pH-value of the aqueous solution of 7, preferably of from 5 to 6.8.

The salts of the acylhydroxymethane-phosphinic acids are used in an amount of from 0.1 to 5, preferably of from 0.3 to 3% by weight, calculated on the total quantity of the monomere. They may be present at the beginning of the polymerization or be added after the beginning of the polymerization, or a part of the salts may be present and the other part be added later. Preferably an amount of the emulsifier of from 0.1 to 0.3% by weight should be present in the liquor and the remainder be added during the polymerization and during the after-heating phase.

According to the process of the invention there may be prepared latices from polymers of any kind, which latices after pigmentation, application onto a substrate and drying are capable of giving coatings of paint with wet adhesion. The polymer may be made of vinyl esters (for example vinyl acetate, vinyl propionate, vinyl-n-butyrate, vinyl-i-butyrate, vinyl esters of long chain, linear or branched carboxylic acids having from 5 to 18 carbon atoms such as 2-ethyl-hexanoic acid vinyl ester, lauric acid vinyl ester or vinyl esters of a mixture of branched isomeric carboxylic acids having 10 carbon atoms), of acrylic and methacrylic acid esters (for example methyl, ethyl, butyl, 2-ethylhexyl-acrylate, methyl-methacrylate or butylmethacrylate), of styrene, of vinyl halides (for example vinyl fluoride, vinyl chloride or vinylidene chloride), of diolefins (for example butadiene, chloroprene or isoprene), of monomers containing nitrile groups (for example acrylonitrile, $\alpha$-cyano-acrylic acid acryl esters or $\beta$-cyanoethylacrylic acid esters), of vinyl ethers (for example vinylmethyl or vinyl-i-butyl ethers), or of $\alpha$-olefins (for example ethylene or isobutylene). The monomers may be used alone or in admixture with one another.

In the co- or terpolymerization said monomers are generally used in a ratio to yield polymers having a minimum film forming temperature (white point) in the range of from 0 to 30° C. Higher film forming temperatures are also possible. The film formation at room temperature may be achieved by adding solvents to the paint.

Suitable free radical forming initiators are water-soluble peroxy compounds, preferably the alkali metal salts or ammonium salts of the peroxy disulfuric acid. They may alternatively be used in combination with peroxy diphosphates. For improving the polymerization velocity or for activating the polymerization, even at low temperatures, reduction agents such as sulfites, dithionites or formaldehyde-sodium sulfoxylate and small amounts of heavy metal salts, for example of iron or copper, may be added. Suitable initiators are moreover water-soluble azo compounds, for example the alkali metal salts of the 2,2'-azo-bis(2-cyano-valeric)acid. The initiators are used in the usual amount of from 0.05 to 1, preferably of from 0.1 to 0.4% by weight, calculated on the total amount of the monomers. The initiator may be present at the beginning or be added lateron. When using a redox system, the initiator may be added first and the reduction component may be added thereafter or vice versa.

The polymerization is carried out at a temperature of from 25 to 90, preferably of from 40 to 75° C.

Suitable buffers are salts of mono- or polycarboxylic acids, for example sodium acetate, sodium citrate, sodium polyacylate, the salts of mono- and polyphosphates and -phosphonates, for example disodium hydrogenophosphate, tetrasodium pyrophosphate, sodium hexametaphosphate, sodium-1-hydroxyethane-1,1-diphosphonic acid or the sodium salt of the nitrilo-tris(-methylene phosphonic)acid.

For maintaining the pH-value during the polymerization constant, alkalies, for example soda, potash, sodium hydroxide solution or potassium hydroxide solution may be added during the polymerization.

Low- or high-molecular weight water-soluble compounds which do not detrimentally affect the wet adhesion may be added to the latex to improve its resistance to storage, shearing and freezing and for improving its compatibility with pigments. There may be mentioned, by way of example, ammonium laurate, hydroxyethyl cellulose, poly(vinylalcohol), poly($\alpha$-oxyacrylic acid), the ammonium salts of copolymers of styrene, ethylene or vinyl methyl ether with maleic acid anhydride. These compounds may be added to the liquor prior to polymerization, or during polymerization or be added to the latex upon completion of the polymerization.

The plastics dispersions prepared in said manner are suitably used as binders in dispersion paints which adhere after wetting. The pigments are thereby frequently used in the form of pastes, for example titanium dioxide dispersed in water. The pigment pastes may contain thickeners, for example cellulose derivatives, such as methyl, ethyl, hydroxyethyl, or carboxymethyl cellulose, poly(vinyl pyrrolidone), poly(vinyl alcohol), poly(acrylic acid) or poly(methacrylic acid).

For better dispersing the pigment in water, there are frequently used dispersing agents, for example low-molecular weight poly(acrylic acid), or poly(methacrylic acid) or sodium polyphosphate. Usual constituents of pigments pastes are furthermore fillers, perservatives, defoaming agents, ammonia, alkalies such as sodium hydroxide or potassium hydroxide, and solvents, for example glycols such as ethylene glycol, propylene glycol, hexylene glycol, or glycol ethers, for example methyl, ethyl, propyl or butyl-mono-, -di- or -triglycol ethers. Further usual solvents in pigments pastes are glycol esters, for example mono-, di- or triglycol acetate, -propionate or -butyrate or glycol ether esters, for example methyl, ethyl, propyl or butyl-mono-, di- or triglycol acetate, propionate or butyrate. The organic solvents are added to the paint in an amount of from 1 to 20% by weight, preferably of from 3 to 15% by weight, calculated on the total weight of the paint.

For better dispersing the pigment, the paste is in most cases processed in dissolvers, ball mills or on roll mills.

The plastics dispersions according to the invention are furthermore distinguished by the fact that they have a high pigment binding capacity when used in dispersion paints, and that they confer upon coating compositions for paper especially those based on kaolin-starch-plastics dispersion lower viscosities than usual plastics dispersions based on styrenebutadiene.

The invention will be illustrated by the following examples. In the examples "parts" are to be understood as "parts by weight" and "%" as percentages by weight, unless otherwise stated.

EXAMPLE 1

(a) Preparation of the plastics dispersion:

600 parts of water free from electrolytes are fed to a stirrer apparatus equipped with internal thermometer, reflux condenser and two dosage vessels and are flushed for 15 minutes with nitrogen, while stirring. After heating to 75° C., 90% of an initiator solution consisting of 2.54 parts of ammonium persulfate in 40 parts of water are added. Furthermore the addition of a solution of 8.9 parts of lauric acid hydroxymethanephosphonic acid ester (partially neutralized with sodium hydroxide solution, pH 6) in 70 parts of water and of a mixture of 592 parts of vinyl acetate and 148 parts of a mixture of vinyl esters of branched isomeric carboxylic acids having 10 carbon atoms is started.

The emulsifier solution is added within 10 minutes and the monomer mixture within 3 hours. Upon completion of the emulsifier addition, the pH of the reaction medium is maintained at 5 by adding a 1.25% solution of $Na_4P_2O_7$ and NaOH. The weight ratio between $Na_4P_2O_7$ and NaOH is 63:37. After addition of the monomers, the residual 10% of the initiator solution are added and stirring is continued for 1 hour at 75° C. whereby the pH is maintained at 5 by adding alkaline pyrophosphate solution; 48 parts of the solution are consumed. After cooling the dispersion to room temperature, the pH of the dispersion is adjusted at a range of from 5 to 6.5 by means of 52 parts of the alcaline pyrophosphate solution. There is obtained a finely divided copolymer dispersion having a solids content of 48.5% by weight. The average diameter of the latex particles is 0.11 microns. A film of 0.15 mm thickness which has been dried at 23° C. at a relative moisture of the air of 65% does not turn white even after 10 minutes.

(b) Preparation of the dispersion paint:

| | | |
|---|---|---|
| water | 41 | parts |
| hydroxyethyl cellulose as 3 % aqueous solution | 15.6 | parts |
| sodium tripolyphosphate | 0.4 | part |
| 25 % aqueous ammonia solution | 1.0 | part |
| ammonium polyacrylate as 30 % aqueous solution | 3.0 | parts |
| preservating agent | 2.0 | parts |
| defoaming agent | 3.0 | parts |
| titanium dioxide (rutile) | 175 | parts |
| propylene glycol-(1,2) | 10 | parts |

The above components are homogenized for 10 minutes in a dispersing apparatus, thereafter 710 parts of the plastics dispersion of Example 1a which has been adjusted to a pH of 9.5 by means of concentrated ammoniac solution are added while stirring. Finally the paint is mixed with 10 parts of butyl diglycol acetate and 27 parts propylene glycol.

(c) Examination of the wet adhesion:

The paint is applied onto a glass plate which is coated with an alkyd resin, by means of a 200 micron doctor. The coating of paint is dried for 24 hours at 23° C. and at a relative moisture of the air 65%. Thereafter it is brushed in an abrasion device by means of a wetted brush with hog's bristles moving to and fro. The coating is kept wetted by periodic addition of water. The coating of paint is not damged after 3,000 passages of the brush, one passage including a backward and a foreward stroke.

EXAMPLE 2

The example is carried out as Example 1, with the exception that there are added to the plastics dispersion, after the addition of the concentrated ammonia solution, 140 parts of a 5% hydroxyethyl cellulose. After drying of the paint, there is obtained a dull coat of paint as in Example 1. When testing the wet adhesion, there is found no damage of the paint of coating even after 3,000 passages of the brush, one passage including a backward and a foreward stroke.

EXAMPLE 3

The example is carried out as Example 1, except that there are added to the plastics dispersion, after addition of the concentrated ammonia solution, 81 parts of a 17.5% ammonium salt solution consisting of a copolymer of styrene and maleic acid anhydride in a ratio of 3:1 having an average molecular weight 2,200. After drying of the paint, there is obtained a glossy coating, which is not damaged in the wet adhesion test after 3,000 passages of the brush, one passage including a backward and a foreward stroke.

COMPARATIVE EXAMPLES 1 to 7

The procedure is the same as in Example 1, except that there are used instead of lauric acid hydroxymethane-phosphonic acid ester, 8.9 parts of the emulsifiers listed in table 1. The dispersion paints are prepared and tested with regard to their wet adhesion in the manner described in Example 1c.

TABLE I

| Comp. Ex. | Emulsifier | Passages of the brush |
|---|---|---|
| 1 | sodiumlaurylsulfate | 195 |
| 2 | sulfosuccinic acid-bis(2-ethylhexyl ester) | 220 |
| 3 | dodecyl benzene sulfonate | 230 |
| 4 | sulfated oxethylated tert. butyl phenol | 564 |
| 5 | $[CH_3-(CH_2)_{10}-COO-CH_2-CH_2-CH_2-N(CH_3)_3]Cl$ | 210 |
| 6 | $CH_3-(CH_2)_{10}-COO-CH_2-CH_2-SO_3Na$ | 650 |
| 7 | $CH_3-(CH_2)_{11}-OOC-CH_2-SO_3Na$ | 146 |

It can be seen from the table 1, that the emulsifiers do not impart a wet adhesion to the plastics dispersion prepared therewith. The emulsifiers used in the Comparative Examples 5 to 7 which may be split off do not lead to positive results, either. When using the emulsifier of the formula $[CH_3-(CH_2)_{11}-OOC-CH_2-N(CH_3)_3]Cl$ which may be split off, there was not obtained a latex, owing to the fact that the polymerization was hindered.

EXAMPLE 4

(a) Preparation of the plastics dispersions:

8.9 parts of lauric acid hydroxymethane-phosphonic acid ester are dissolved in 600 parts of water free from electrolytes, in the stirrer apparatus described in Example 1, and the phosphonic acid is partially neutralized with 50% sodium hydroxide solution (pH 6). After addition of 2.54 parts of ammonium persulfate the contents of the apparatus are flushed for 15 minutes while stirring with nitrogen and are heated thereafter to 65° C. 740 parts of vinyl acetate are metered in within a period of 3 hours. Thereby the pH of the reaction medium is maintained at a level of 5 by the addition of 1% sodium hydroxide solution. Upon completion of the vinyl acetate addition, stirring is continued for half an hour at 75° C. whereby the pH value is maintained at 5; 33 parts of 1% sodium hydroxide solution are consumed. After cooling of the dispersion to room temperature, the pH of the dispersion is adjusted at a value of 5 from 5 to 6.5 by means of 47 parts of 1% sodium hydroxide solution, and thereafter there are added 30 parts of water. There is obtained a finely divided poly(vinyl acetate) dispersion having a solids content of 47.6%. The content of residual monomers is 0.18%.

(b) Preparation of the dispersion paint:

The pigment paste is prepared as in Example 1b. 710 parts of the above plastics dispersion are incorporated into the paste by stirring. After having adjusted the pH of the plastics dispersion to 9.5 there have been added 81 parts of the ammonium salt solution of the styrene-maleic acid anhydride copolymer of Example 3.

(c)

The coating of paint was tested as under 1c. It had not been damaged after 3,000 passages of the brush, one passage including a backward and a foreward stroke.

COMPARATIVE EXAMPLE 8

The procedure is analogous to that of Example 4, except that the emulsifier used in the sodium salt of sulfosuccinic acid-bis(2-ethylhexyl)ester. Coagulation could be observed after the pH of the dispersion had been adjusted to 9.5 by means of concentrated ammonia solution.

EXAMPLE 5

In the stirrer apparatus of Example 1, there are dissolved 8.9 parts of lauric acid hydroxymethane-phosphonic acid ester in 500 parts of water free from electrolytes. Thereafter the phosphonic acid is partially neutralized with 50% sodium hydroxide solution (pH 6). After addition of 2.54 parts of ammonium persulfate, the contents are flushed while stirring with nitrogen for 15 minutes, and are thereafter heated to 75° C. A mixture consisting of 592 parts of vinyl acetate and 148 parts of a mixture of vinyl esters of isomeric carboxylic acids having 10 carbon atoms as well as a solution of 7 parts of poly($\alpha$-oxyacrylic acid) in 100 parts of water, which has been adjusted to a pH of 7 by means of sodium hydroxide solution, are metered in in the course of 3 hours. The pH of the reaction medium is maintained at a value of 5 by adding 1.25% $Na_4P_2O_7$/NaOH solution. Upon completion of the monomer addition stirring is continued for half an hour at 75° C., whereby the pH is maintained at a value of 5; 21 parts of alkaline pyrophosphate solution are consumed. After cooling of the dispersion to room temperature, the pH of the dispersion is adjusted to 6.5 by means of 93 parts of the alkaline pyrophosphate solution. There is obtained a finely divided copolymer dispersion (average diameter of the latex particles 0.147 microns) having a solids content of 50.8%. The dispersion paint is prepared as described in Example 1b, and the wet adhesion is tested as described in Example 1c. The coating of paint has not been damaged after 3,000 passages of the brush, one passage including a backward and a forward stroke.

COMPARATIVE EXAMPLE 9

The procedure is analogous to that of Example 5, except that there is used sodium lauryl sulfate instead of the phosphonic acid emulsifier. There is obtained a finely divided 51% copolymer dispersion. The coating of paint, however, which has been prepared in analogous manner to Example 5, is destroyed after 503 passages of the brush.

COMPARATIVE EXAMPLE 10

The example is carried out as has been described in Example 5, except that the emulsifier used is sulfosuccinic acid bis(2-ethylhexyl)ester. The wet adhesion of the dispersion paint prepared could not be tested because coagulation occurred.

EXAMPLE 6

10,000 parts of water are introduced into a stirrer autoclave under reduced pressure. The water is flushed while stirring, with nitrogen, and thereafter ethylene is injected into the autoclave until a pressure of 20 atmospheres has been obtained in the autoclave. After having heated the contents of the autoclave to 45° C., 25% of a solution consisting of 175 parts of lauric acid hydroxymethane-phosphonic acid ester and 19 parts of sodium disulfite in 2,000 parts of water, which has been adjusted to a pH of 6.8 by means of 50% sodium hydroxide solution, are metered in. Upon addition of 1270 parts of vinyl acetate there is added a solution of 45 parts of ammonium persulfate in 400 parts of water. The inner temperature is adjusted to 60° C. and in the course of 6 hours, the residual emulsifier solution as well as a further 11,430 parts of vinyl acetate are added. The ethylene pressure is kept constant at 20 atmospheres. The ethylene feed is terminated upon completion of the vinyl acetate addition, and a solution of 15 parts of ammonium persulfate in 600 parts of water is added and the contents of the autoclave are heated to 85° C. During the heating process and at the final temperature of 85° C., for a period of 30 minutes, there is metered in a solution of 130 parts of lauric acid hydroxymethane-phosphonic acid ester in 1,170 parts of water, which has been adjusted to a pH of 6.8 by means of sodium hydroxide solution. Stirring is continued for half an hour at 85° C., the contents are cooled to 30° C. and the dispersion is allowed to flow from the autoclave. There is obtained a finely divided vinyl acetate copolymer dispersion, the copolymer of which has 11% of ethylene and which has a solids content of 50.9%. The average diameter of the latex particles is 0.22 microns. A dispersion paint is prepared as has been described in Example 3 and the wet adhesion is tested. The highly brilliant coating of paint has not been damaged after 5,000 passages of the brush, one passage including a backward and a foreward stroke.

EXAMPLE 7

Into the stirrer apparatus of Example 1 there are introduced 600 parts of water, 0.9 parts of ammonium persulfate and 10% of a solution consisting of 9 parts of lauric acid hydroxymethane-phosphonic acid ester in 100 parts of water, the pH of which has been adjusted to a value of 6 by means of sodium hydroxide solution. The components are flushed with nitrogen while stirring for a period of 15 minutes and are heated thereafter to 60° C. Thereafter a mixture consisting of 370 parts of styrene and 370 parts of butyl acrylate and the residual 90% of the emulsifier solution are metered in over a period of 3 hours. Thereafter there are added 0.45 part of ammonium persulfate dissolved in 20 parts of water, and stirring is continued for 30 minutes at 75° C. The finely divided latex is cooled to room temperature, its pH is adjusted to 6.5 by means of 20 parts of 1.25% soda solution and is filtered whereby 3 parts (weighted in the wet state) of coagulate are separated.

For preparing the dispersion paint, 710 parts of latex are adjusted to a pH of 9.5 by means of concentrated ammonia solution. Thereafter 18.8 parts of 20% ammonium laurate and 106 parts of a 10% hydroxyethyl cellulose are incorporated by stirring. The rest of the procedure is analogous to that to Example 1. There is obtained a dull coating of paint, which has not been damaged after 3,000 passages of the brush, one passage including a backward and a forward stroke.

What is claimed is:

1. An aqueous dispersion paint having relatively high wet adhesion, said paint comprising an aqueous dispersion of a film-forming polymer which is a homopolymer or copolymer of one or more monomers selected from vinyl esters, acrylic and methacrylic acid esters, styrene, vinyl halides, vinyl ethers, diolefins, α-olefins and monomers containing nitrile groups; an emulsifier; and a pigment dispersed in said aqueous dispersion; said emulsifier being a salt of an acyl ester of hydroxymethane phosphonic acid having the formula:

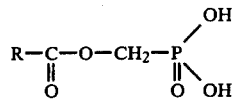

in which R is a hydrocarbon radical having 5 to 23 carbon atoms and being present to the extent of 0.1 to 5% by weight of said monomers.

2. An aqueous dispersion paint according to claim 1 wherein R in the formula for the emulsifier is lauryl.

3. A process for preparing an aqueous dispersion paint having improved wet adhesion which comprises preparing an aqueous dispersion of a homopolymer or copolymer of one or more monomers selected from vinyl esters, acrylic acid esters, methacrylic acid esters, styrene, vinyl halides, vinyl ethers, diolefins, α-olefins, and monomers containing nitrile groups, in the presence of a free radical-forming initiator and an emulsifier which is a salt of an acyl ester of the hydroxymethane phosphonic acid of the formula

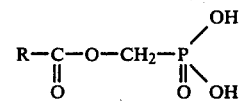

in which R is a hydrocarbon radical having from 5 to 23 carbon atoms, said emulsifier being present to the extent of 0.1 to 5% by weight of said monomers, and incorporating a pigment in the resulting dispersion to form said aqueous dispersion paint.

4. Process as claimed in claim 3, which comprises using the emulsifier in an amount of from 0.1 to 5% by weight, calculated on the total amount of the monomers used.

5. Process as claimed in claim 23, which comprises using as emulsifier the ammonium, lithium, sodium, potassium or tetramethylammonium salt of the acylated hydroxymethanephosphonic acid.

6. Process as claimed in claim 3, which comprises using as emulsifier a salt of the acylated hydroxymethane-phosphonic acid, which has been prepared by neutralization of the acid to obtain a pH of the aqueous solution of from 5 to 6.8.

7. Process as claimed in claim 3, which comprises adding the emulsifier in an amount of from 0.1 to 0.3% by weight, calculated on the total quantity of the monomers used, at the beginning of the polymerization and adding the rest lateron.

* * * * *

UNITED STATES PATENT AND TRADEMARK OFFICE
CERTIFICATE OF CORRECTION

PATENT NO. : 4,169,086
DATED : September 25, 1979
INVENTOR(S) : Nolken

It is certified that error appears in the above—identified patent and that said Letters Patent is hereby corrected as shown below:

IN THE CLAIMS:

Claim 5 (column 10, line 23), "claim 23" should read --claim 3--.

Signed and Sealed this

Twenty-sixth Day of January 1982

[SEAL]

Attest:

*Attesting Officer*

GERALD J. MOSSINGHOFF

*Commissioner of Patents and Trademarks*